June 6, 1961 M. R. RIOLA 2,986,945
GYROSCOPIC INSTRUMENT
Filed Sept. 25, 1957 3 Sheets-Sheet 1
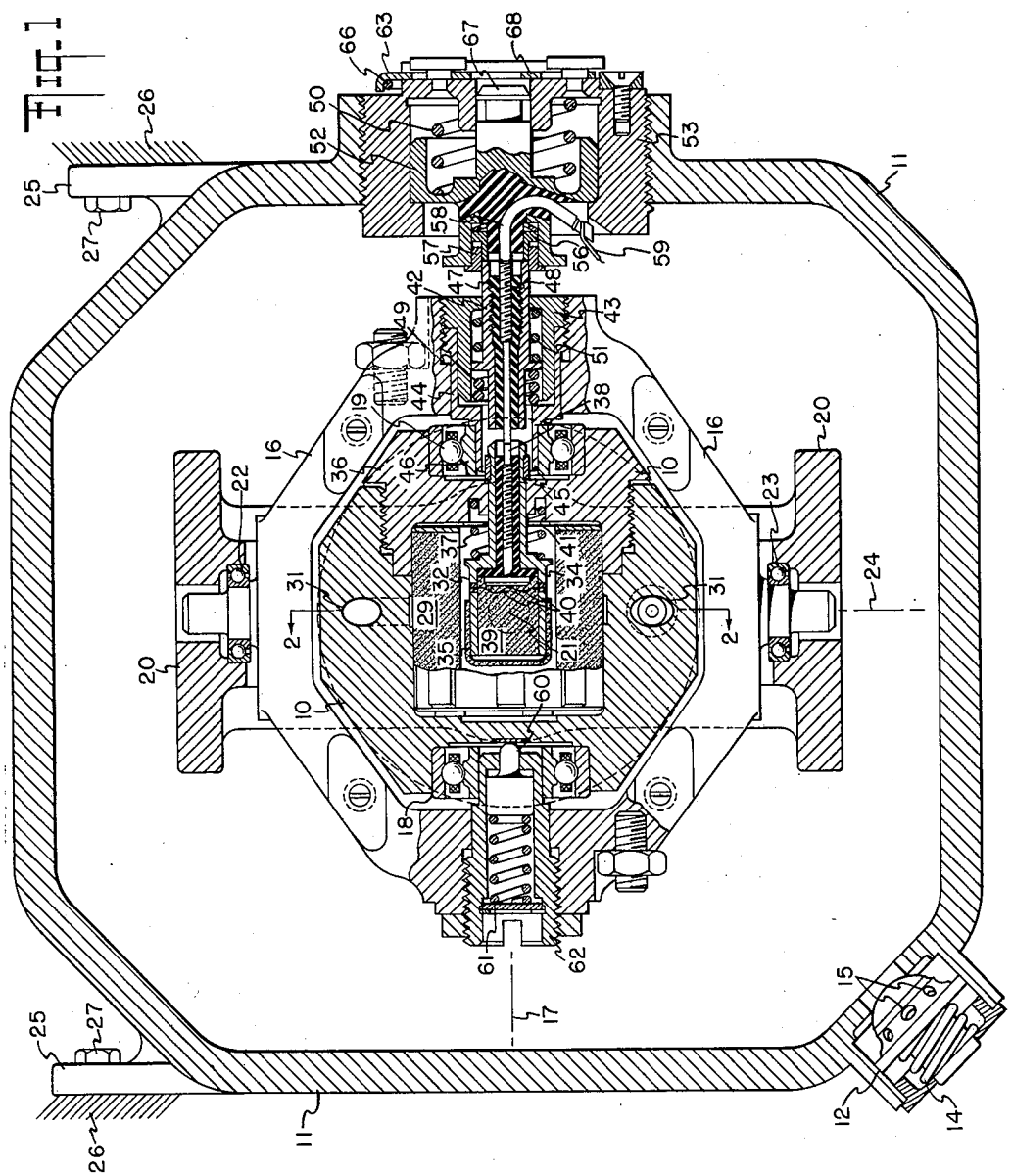
INVENTOR
MICHAEL R. RIOLA
BY
Arthur H. Serrell
ATTORNEY June 6, 1961 M. R. RIOLA 2,986,945
GYROSCOPIC INSTRUMENT
Filed Sept. 25, 1957 3 Sheets-Sheet 2
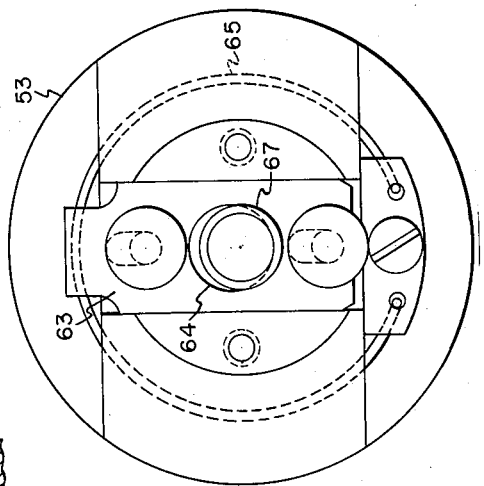
FIG. 4
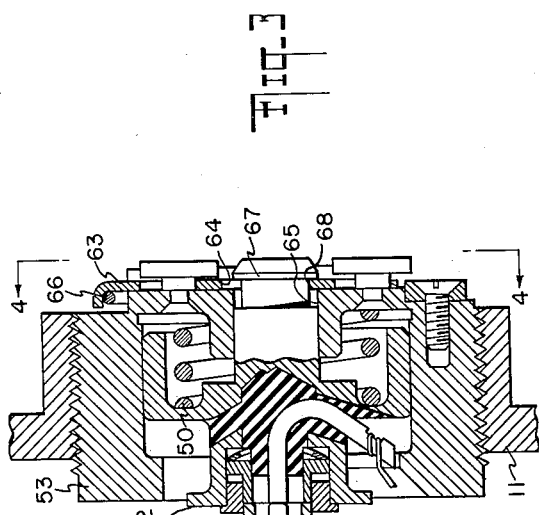
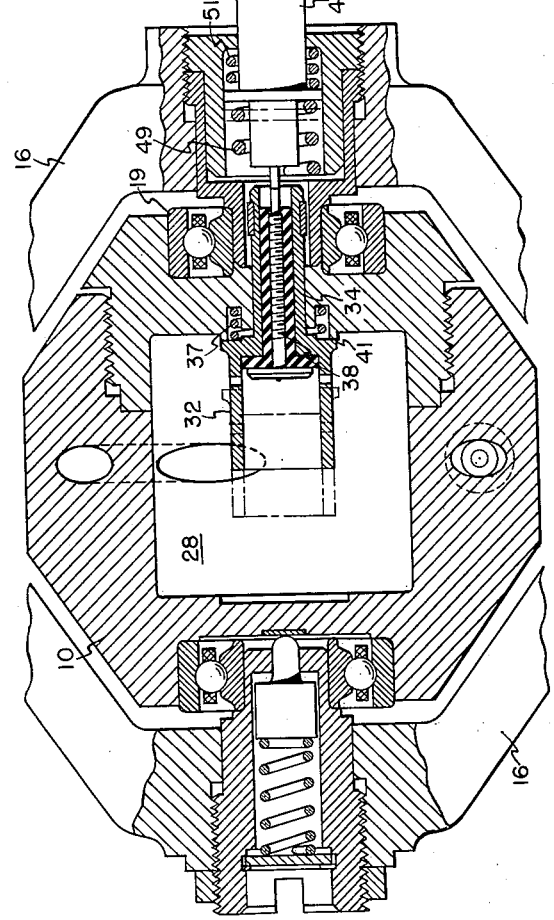
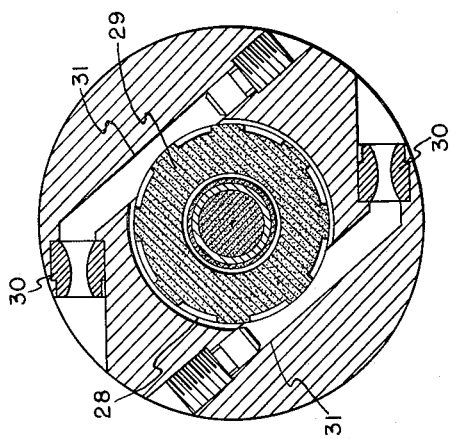
FIG. 2
INVENTOR
MICHAEL R. RIOLA
BY Arthur H. Serrell
ATTORNEY

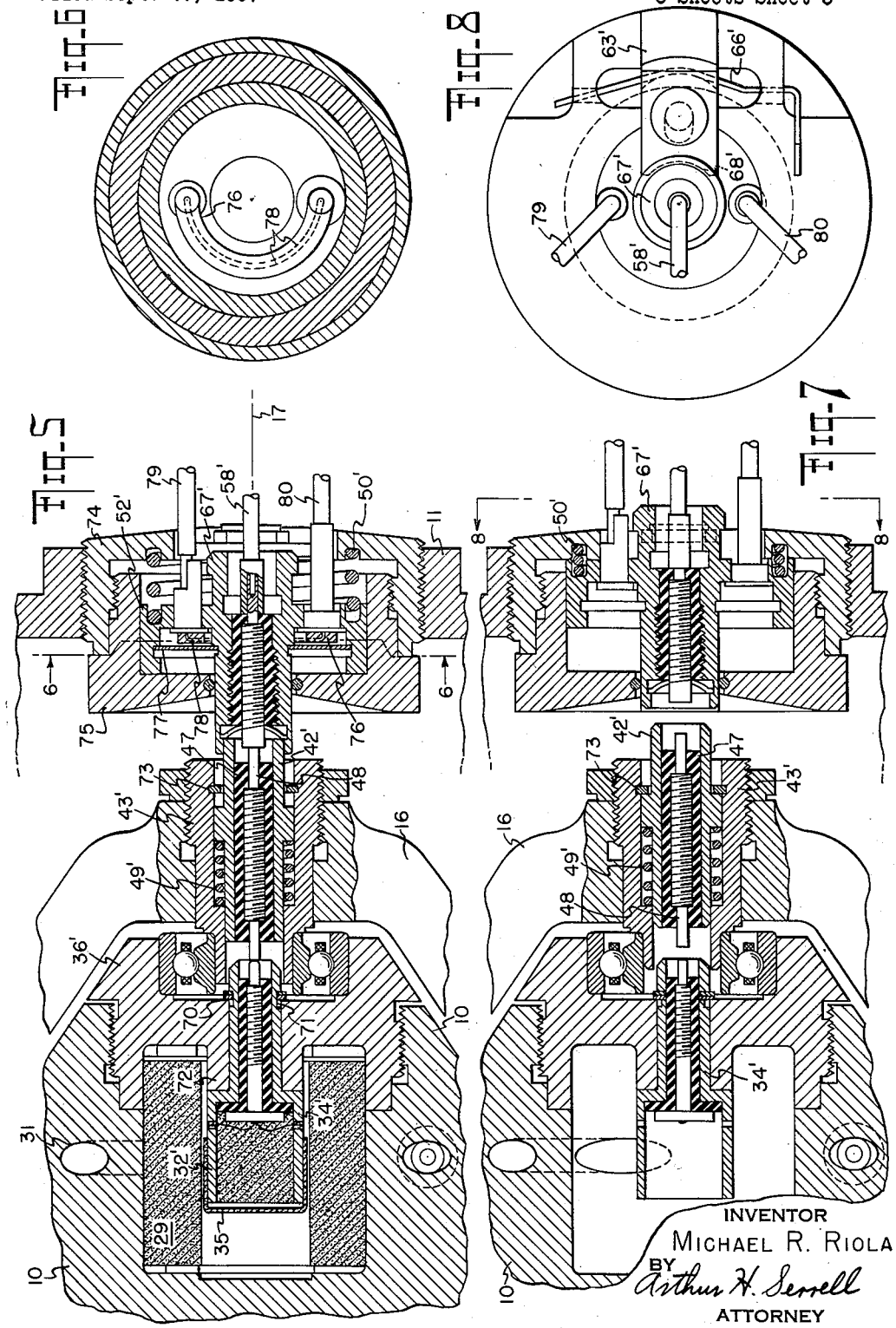

United States Patent Office 2,986,945
Patented June 6, 1961

2,986,945
GYROSCOPIC INSTRUMENT
Michael R. Riola, New Hyde Park, N.Y., assignor to Sperry Rand Corporation, a corporation of Delaware
Filed Sept. 25, 1957, Ser. No. 686,812
27 Claims. (Cl. 74—5.12)

This invention relates to an improved gyroscopic instrument of the reference providing type. The rotor of the improved instrument is preferably mounted with two degrees of freedom and is driven by means of expanding gases generated by a solid propellent grain located in a closed chamber therein. The instrument is useful over a relatively short time span as a component of a guidance system or automatic pilot for a missile or craft that detects motion of the missile or craft about an axis thereof. Instruments of this character may be located on the missile or craft to provide yaw, pitch and roll attitude data. By proper arrangement, dual information of this character may be obtained from a single instrument.

Advantages of the propellent-driven gyroscopic instrument over those where the rotor is driven electrically reside in the elmination of extensive power equipment for bringing the rotor up to speed, the saving of time required in starting up the instrument and in getting the rotor to its operating speed from a standstill condition, and in reduction in the maintenance requirements needed to assure proper functioning of the device.

One of the objects of the invention is to provide an instrument of this character whose rotor is rapidly accelerated to operative speed from a standstill condition by the reaction of gases generated by a burning propellent grain after ignition by a detonating device supported within the rotor.

A further object of the invention is to provide a releasing means for the caging device of the improved instrument whose operation is dependent on the ignition of the propellent grain.

A feature of the improved instrument resides in the provision of a rotor member for the rotor element that supports the detonating device or cartridge within the chamber of the rotor containing the propellent grain.

Another feature of the invention is provided by a rotor member structure for the rotor element that includes an input lead to the electrical detonator of the instrument.

A still further novel feature is provided by the connector structure utilized on the rotor, ring and frame elements of the instrument. The components of this structure serve both electrical and mechanical purposes in providing an input lead to the detonator from the frame and in providing an interlock or caging device or means between the ring and frame elements of the instrument.

Another novel feature resides in the provision of an interlock between the frame or housing and the corresponding cage and electrical connecting member that is operable upon ignition of the propellent grain to disable the caging means employed to lock the ring element to the frame or housing of the instrument.

Other objects, features and structural details of the present invention will appear from the following description of the embodiments herein illustrated in the accompanying drawings, in which FIG. 1 is a top plan section view of an embodiment of the improved gyroscopic instrument, the view being taken along the horizontally located spin axis of the rotor of the instrument, FIG. 2 is a cross section view taken on line 2—2, in FIG. 1, FIG. 3 is an enlarged view similar to FIG. 1 showing the position of the electrical conductors and cage members of the instrument as urged to a cage releasing position upon ignition of the propellent grain and in which the frame cage member is locked in an uncaged condition, FIG. 4 is an end elevation showing the cage disabling means on the frame or housing of the improved instrument, FIG. 5 is a view similar to FIG. 3 showing a modified form of the improved instrument in which the electrical conducting member of the rotor is mechanically interlocked to the rotor to prevent relative movement between these parts when the propellent grain is ignited, FIG. 6 is a section view taken on line 6—6 in FIG. 5, FIG. 7 is a view similar to FIG. 3 in which the elements of the embodiment of the invention depicted in FIG. 5 are shown in uncaged relation with the frame cage member of the combination engaged by the disabling means, and FIG. 8 is an end elevation of the portion of the frame or housing element of the instrument of FIG. 5 containing the frame cage member in which the cage disabling means is shown.

As shown in FIG. 1 of the drawing, the improved gyroscopic instrument embodying the present inventive concepts is a two degree of freedom type in which the rotor 10 is universally supported within a housing or frame 11. The housing or frame element of the instrument is preferably closed and includes one or more valves thereon as indicated at 12 to permit the gases of the propellent grain to vent from the housing to the atmosphere. As shown, the seat for the valve 12 is provided by the rim of a circular opening in the closed housing 11. The valve 12 is biased to a closed condition by a spring 14 and includes an opening in its stem that leads to the peripheral ports 15. In its closed condition, the valve seals the housing 11 from the entrance of air. In operation, the valve is opened against the action of the biasing spring 14 by the pressure of gases within the housing 11 due to the ignition of the propellent grain. The gases escape to the atmosphere through the opening providing the valve seat and by way of ports 15 to the opening to the atmosphere contained in the stem of the valve.

Rotor 10 is supported within the housing or frame element by a ring element 16, the spin axis 17 being defined by the spaced bearing connections between these elements indicated at 18 and 19. In the type of instrument shown in FIG. 1, the gimbal ring element 16 is supported in the frame or housing 11 by means of a second gimbal ring 20. Ring 20 of the instrument is mounted with freedom about a vertical axis 21, the connection between the gimbal 20 and frame 11 being provided by suitably spaced bearings (not shown) located in the respective upper and lower walls of the closed housing or frame 11. The ring element 16 carrying the rotor element 10 is supported on the ring 20 by the spaced bearings 22, 23 providing an axis 24 of freedom for the rotor 10 that is normally horizontal and perpendicular to the support axis 21. The rotor 10 of the instrument is supported by the ring 20 to spin about the axis 17 which is normally horizontal and perpendicular to the ring axis 24. The frame or housing 11 includes mounting brackets 25 by which the instrument is suitably affixed to the chassis of the craft or missile 26 by connecting bolts 27, the gyroscopic components being oriented with relation to the missile so that the axes 17, 21 and 24 are located in the manner described herein. With this arrangement, the operative gyroscopic instrument functions to provide an azimuth reference that detects motions of the missile or craft about its vertical axis. The measurement of such motion may be obtained from a suitable pick-off device (not shown) with a part fixed to the frame 11 and a part fixed to the ring 20 that detects relative displacement of the parts about axis 21 to provide the output. By proper location of the housing with relation to the craft or missile, the improved instrument may be utilized to provide yaw, pitch or roll reference data. By utilizing an additional pick-off at the axis 24 of the rotor of the instrument dual information of the character noted may be obtained from the single instrument.

As shown in FIGS. 1 and 2, the rotor 10 of the improved instrument is constructed of two interfitting screw-threaded parts that provide an axial cylindrical chamber 28 therein in which the propellent grain 29 is located. The rotor illustrated includes two tangentially directed nozzles or vents 30 at the periphery thereof that communicate with the internal chamber or cavity 28 by way of the channels 31. The ignitible grain 29 employed to spin the rotor 10 is a suitable solid chemical composition of an annular form fitting the chamber 28 such as produced by the Picatinny Arsenal as the T–19 propellant. The spacings shown in FIG. 1 between the ends of the cylindrical grain 29 and the chamber 28 and the axial grooves provided in the grain, FIG. 2, assure uniform burning of the same after ignition. The ignited grain burns in a fraction of a second and the combustion gases thereof exhausting through the expansion vents 30 cause acceleration of the rotor from a standstill condition to a high spinning speed in a correspondingly short time.

The grain igniting means of the instrument is a suitable chemical igniter that is carried in a cartridge 32 mounted on one end of a rotor member or component 34. A cellulose nitrate cap 35 is provided to close the open end of the cartridge 32. In the arrangement shown, the electrically fired detonating element including the cartridge 32 is supported in the rotor chamber 28 within the annular opening contained in the propellent grain 29. Detonator supporting rotor member 34 is translatably mounted in the removable cap end portion 36 of the rotor for movement along the rotor axis 17. A spring connection 37 between rotor cap part 36 and member 34 normally positions the elements so that the cartridge 32 is midway between the respective ends of the cylindrical chamber 28. The support rotor member 34 also includes an electrical conductor or input lead 38 along the axis 17 and a suitable annular insulator for the lead. The inwardly disposed end of the lead 38 connects with a conductor cap located within and insulated from the cartridge 32 containing the grain igniting chemical composition 39. Small conducting wires 40 that pass through the composition 39 connect the end cap of conductor 38 and the cartridge 32 which is also constructed of electrically conductive material. The high resistance wires 40 of the electrical detonator glow when energized by electrical energy supplied from a suitable source by way of input lead 38 to ignite the chemical composition 39 and cap 35 which in turn causes ignition of the propellent grain 29. Removable rotor cap part 36 facilitates assembly of the internally located grain and detonator supporting member parts. The two matching parts of the rotor 10 are constructed so that its balance is not changed by the propellent grain 29 or the rotor element 34 and cartridge 32.

The starting means of the instrument includes the electrical detonator and the propellent grain ignited by the detonator which are simultaneously effective upon closure of the circuit to the wires 40 from a suitable electrical energy supply source to cause the rotor 10 to spin about axis 17 in the manner previously described. In the embodiment of the invention shown in FIG. 1, the spring held member 34 of the rotor functions to move the components constituting the caging means of the instrument to a condition where the disabling means for the caging means is rendered effective. This operation is dependent on the operation of the starting means responsive to the pressure within the chamber 28 upon ignition of both the detonator and the grain. Accordingly, the firing of the detonator causes the member 34 to move in translation along axis 17 against the action of the spring 37, the spring being compressed within a circular slot 41 in the rotor cap member 36. The motion is limited by the engagement of the closed wall of cartridge 32 against a seat defining portion of the internal wall of the cap rotor part 36. The position of the described parts during the firing period of the grain is clearly shown in FIG. 3. During this short time period, the spring 37 located within the closed slot 41 is protected from the heat of the explosive gases of the detonator and grain and leakage of gases along the axis 17 of the member 34 is effectively prevented. As the pressure resulting from the burning of the ignited grain decreases to null, the cartridge supporting member 34 is returned to its normal position with respect to the rotor 10 by the spring 37, as shown in FIG. 1, in which the cartridge 32 is at the center of the rotor. The effect of the described operation of member 34 on the caging means provided in the instrument will be hereinafter described in detail.

The rotor member 34 and the cartridge 32 included at one end thereof constitute an element which performs a dual mechanical and electrical function. The rigid electrical conductor or input lead 38, which is fixedly bonded to the rotor element 34 by the molded plastic insulating sleeve, makes a butt contact with a similarly insulated rigid electrical conductor 48 which is bonded by a plastic insulating sleeve 47 to the element 42 and thereby conducts the energizing current from conductor 48 to the detonating wires 40. At the same time, by virtue of the butt contact between the rigid conductors 38 and 48, the translational motion of element 34 under the pressure of the generated gases within chamber 28 is mechanically transferred to element 42 causing it to translate an equal amount along axis 17.

The component of the depicted gyroscopic structure that cooperates with element 34 and provides an electrical connection to the lead 38 is the ring mounted element of the improved caging means. As shown, this element is provided by an annular piston shaped sleeve 42 that is translatably mounted to move along the axis 17 of the rotor 10 in a cylinder forming element 43 that is fixedly secured by a threaded connection or otherwise in a suitable opening on the ring 16 along the noted axis. The outer end of the translatable member 42 extends through an opening in the closed end cylinder wall of the element 43. The inner end of the cylinder element 43 for the piston component 42 is provided by an open ended sleeve 44 fixed to the ring 16 having a portion 45 extending within the rotor cap 36. The inner race 46 of the bearing 19 is fixedly mounted on the portion 45 of the sleeve 44. As shown, the outside end of the rotor element slide component 34 extends within the sleeve 44 in mechanically spaced axial relation to the inside end of the ring element slide component 42. It will be understood that in the described form of the invention, the mechanical spacing of the parts is such that element 34, urged to the right as seen in FIG. 1 under the influence of the pressure in the rotor chamber 28 when the propellent grain 29 is fired, engages the ring member 42 through the butting action of the respective rigid conductors to also move it to the right in a cage releasing operation.

Member 42 also includes an insulating sleeve 47 and an axially located electrical conductor in the form of an input lead or wire 48. FIG. 1 shows the noted electrical components of the respective members 34 and 42 connected so that the input circuit to the detonating cartridge 32 is closed. Frictional drag on the rotor 10 by contact between the parts 34, 42 is prevented by a biasing means provided by a spring 49 on the ring 16 located in the cylinder compartment to the left of the piston of the slide member 42. The spring 49 is normally compressed as shown in FIG. 1 by the action of the spring means 50 of the caging means of the instrument, such spring providing a means for overcoming the biasing spring 49 to connect the rotor and members 34 and 42 in end to end relation along the axis 17. Spring means 51 in the right hand cylinder compartment of the ring element 16 also urges the member 42 toward the left as viewed in FIG. 1. The effectiveness of the spring 51 is insufficient to alone effect engagement of the noted parts. In the position of the components shown in FIG. 3 in which the cartridge 32 and member 34 are urged the maximum permitted distance to the right, the member 34 engaged with member 42 compresses the respective springs 51 and 50. As the pressure in the rotor chamber 28 diminishes after ignition of the grain 29, the cartridge 32 returns to its normal position within the rotor by the action of spring 37. The spring 49 of the ring element is then effective in preventing the components 34 and 42 from returning to an engaged condition under the influence of spring 51, the relative spring strengths being such as to assure an axial spacing between the conductors 48 and 38 of the ring member 42 and rotor member 34, respectively, after the grain is fired and the rotor is spinning. The translatable member 42 on the ring also provides one of the engageable components providing the caging means for the improved instrument by which the ring is caged to the housing or frame 11.

The third connector and composite cage functioning component is provided by a further translatable member located on the frame or housing 11 of the instrument in the form of a piston 52 located in a cylinder defining sleeve 53 fixedly mounted on the frame or housing by a suitable threaded joint. The caging means provided interlocks the ring and frame or housing element of the structure at a point along the axis 17. To facilitate this result the inwardly disposed end of the piston 52 is constructed to engage the outer cylindrical end of the ring member 42 as shown in FIG. 1. In this condition, the piston or frame member 52 of the caging means is translatably mounted for movement along the rotor axis 17. As shown, the inner end of slide member 52 includes an axial opening containing two interfitting telescopically arranged sleeves, the inner sleeve 56 of which contacts the end of member 42 and the outer sleeve 57 of which engages the circumferential end of the member 42 to cage the ring in relation to the frame. A flat spring located between the inner end of sleeve 56 and the inner wall of the cylindrical end of the piston element 52 maintains the parts in spaced relation. The forces exerted along the axis are exerted through the noted spring. The provided caging means includes the spring means 50 located in the chamber in the frame 11 containing the piston 52, the bias provided by the spring means urging the piston 52 to a chamber limited position in which the ring spring means 49 is compressed and the components 42, 52 are interlocked. The spring 50 also axially positions the ring member 42 so that the end lead 48 thereof connects with the end lead 38 of the rotor member 34.

The cage member 52 also provides the third electrical connector through which electrical energy is supplied to the detonating cartridge 32. This structure includes an input lead wire 58 located in a portion of the slide member 52 which is constructed of molded insulating material. As shown in FIG. 1, one end of the wire 58 is located along the axis 17 to contact with the ring lead in conductor 48 when the parts are interlocked in caged condition. The other end of the wire 58 extends from the side of the slide member 52 and as shown is connected with a suitable lead in wire 59. It will be understood that the instrument is started by closing a suitable circuit from an electrical source such as a battery that is connected to the lead in wire 59 and the connected conductors 58, 48 and 38 in the respective frame member 52, ring member 42 and rotor member 34 to the wires 40 in the detonating cartridge 32. The ground for the igniting circuit includes the cartridge 32, the outer sleeve of the rotor slide member 34, the rotor 10, and a pointed conductor 60 carried by the ring 16 whose pointed end engages the rotor at its axis 17. Conductor 60 is a slide member that is biased against the rotor by a biasing spring 61. The sleeve 62 mounted on ring 16 containing the conducting member 61 is also an electrical conductor as is the ring 16, the bearings 22, 23 and ring 20 to the housing 11. The ground to the housing or frame 11 is thus through the gyroscopic parts of the instrument which are all insulated from the input leads 58, 48 and 38. Translatable frame element 52 of the arrangement also provides a dual mechanical and electrical connector with relation to the ring connector 42.

The improved structure includes means for disabling the caging means or separating the dual connectors that is normally ineffective. Such means as shown in FIGS. 1 and 3 is provided by an interlock between the frame member 52 and the frame 11 that disables the caging spring means 50. As particularly shown in FIGS. 3 and 4, the frame mounted element of the disabling means includes a slide member 63 with a central circular opening 64 therein that is normally offset with relation to the axial circular opening 65 in the sleeve 53 forming part of the cylindrical chamber containing the piston element 52. The spring 66 is effective to normally maintain the member 63 in the noted condition. As shown, one end of the piston element 52 is formed to include a detent 67 with an axially tapered surface that slides through the opening 64 in the member 63 when it is urged in a direction counter to the effect thereon of the spring 50. In slipping through the opening 64, the tapered surface of the detent 67 moves the member 63 against the action of spring 66. As the movement continues and the detent extends outside of the member 63, the spring 66 moves the member back to its normal offset position in which it provides a lip 68 that engages the detent 67 to prevent the return of the piston element 52 to its normal position under the influence of the spring 50. This locks the caging parts of the instrument in an uncaged condition where the spring 50 is disabled as clearly shown in FIGS. 3 and 4. The described translation of the frame member 52 is effected in this instance through ring member 42 by the actuation of the translatable rotor member 34 as a result of the ignition of the propellent grain. Engaging detent 67 and interlocking part 63 are normally axially spaced along the axis 17. The means for rendering the cage disabling means effective is operable to translate the cage member 52 containing the detent 67 along the axis 17 in a direction counter to the effect thereon of the spring 50. To set the caging means with the parts properly aligned, the detent 67 is released by an operator pressing on the member 63 in a direction counter to that of the spring 66. This restores the spring 50 to the caging means and urges the respective members 52 and 42 to a caged relation. The instrument is started with the parts thereof conditioned as represented in FIG. 1 with the ring caged to the frame 11 by engaged members 42 and 52 and the portion of the input circuit to the detonator comprising conductors 38, 48 and 58 in connected relation. The starting means including the propellent grain 29 ignited by the detonator cartridge 32 operates to quickly accelerate the rotor 10 from a standstill condition to a normal spinning speed. Operation of the cage disabling or releasing means of the instrument is effected in this instance by the pressure in rotor chamber 28 resulting from the fired grain in translation of the frame member 52, through the ring member 42 by the rotor member 34. The freeing of the ring 16 from the frame 11 is dependent on the firing of the grain. The relation of the parts at the start of the relatively short period required to consume the grain is clearly shown in FIG. 3. The total period necessary for the grain to be totally consumed may be approximately two tenths of a second. The pressure in the chamber 28 diminishes rapidly after the grain is fired so that the cartridge 32 under the influence of spring 37 returns to the position shown in FIG. 1. The spring means 49 for the ring member 42 is now effective to separate the ring member 42 from rotor member 34. Spring 51 of the ring member 42 is also effective to separate the cage members so that ring 16 is free of the housing or frame 11. The cage disabling means rendered effective retains the frame cage member 52 in the retracted position along the axis 17 shown in FIG. 3. Members 34 and 42 provide relatively translatable electrical input lead members that connect along the axis 17 of the rotor. Also, connectors 42 and 52 provide electrical input lead and cage members on the respective ring and frame parts of the instrument that engage along the axis 17 of the rotor to electrically connect the respective leads thereof as well as to cage the ring along the axis 17 of the rotor. The electrically connected frame member 52, ring member 42 and rotor member 34 close an input circuit to the detonator from the housing or frame of the instrument.

FIGS. 5 through 8 show an instrument embodying the present inventive concepts in which the respective rotor, ring and frame structures are modified. As shown in FIG. 5, the conducting rotor member 34' supporting the detonating cartridge 32' within the rotor chamber 28 is mechanically interlocked to the rotor 10 by a locking washer 70 between the rotor cap 36' and one end of a slot 71 in the member 34'. The rotor 10 and rotor member 34' in this embodiment of the invention are mechanically interlocked to prevent relative movement therebetween along the rotor axis 17 when the propellent grain 29 is ignited. The rotor cap 36' includes an internal hub 72 whose wall forms a seat against which the cartridge 32' is located in assembling the parts. The input lead structure of the member 34' and detonator 32' is otherwise the same as that provided for the corresponding element shown in FIG. 1.

The ring structure of the modified instrument shown in FIG. 5 differs from that previously described in the use of a limit piece in the form of a fixed washer 73 in the cylinder providing member 43' containing the translatable ring cage member 42' in place of the spring means 51. The biasing means spring 49' for separating the members 42' and 34' is effective upon release of the caging means to move the member 42' along the axis 17 against the limit washer 73 as shown in FIG. 7. The insulator and lead in parts of the translatable ring member 42' are of a construction similar to that provided in corresponding part 42 shown in FIG. 1.

The translatable frame cage and lead in member 52' of the combination shown in FIG. 5 is urged in caging engagement with the ring cage member 42' by the spring means 50'. In this form of the invention, the cylinder structure containing the slide member 52' is provided by two screw thread connected cylinder wall pieces 74 and 75. Piece 74 of the structure is fixedly mounted on the frame 11 by a suitable screw threaded joint therebetween. The cylinder pieces support the member 52' for axial movement along the rotor axis in a direction counter to the effect thereon of the caging spring means 50'. As shown, the end of member 52' adapted to engage the ring cage member 42' extends through a gland packed opening in the end wall of the cylinder piece 75. The cage disabling means of the arrangement, more clearly seen in FIG. 8, is provided by a detent 67' located at the open end of the member 52' that moves through an opening in the wall of the cylinder piece 74 to engage a spring biased slide member 63' located on piece 74. The biasing spring 66' for the slide member 63' normally locates the curved lip 68' end thereof in relation to the opening in the piece 74 to engage the detent 67' as previously described in connection with FIG. 1 when the axial spacing between the parts is reduced to null. The operation of the cage disabling means is the same as that previously described, the member 52' being held as shown in FIG. 7 with the spring 50' between the frame member and frame being compressed and accordingly rendered ineffective. The normally ineffective cage disabling interlock is rendered effective in this embodiment of the invention by means of the pressure resulting in the firing of a second electrically ignited propellent grain 76, FIGS. 5 and 6. As shown in these figures, member 52' is internally recessed to provide a closed compartment with piece 75 in which the grain 76 is located. An annular diaphragm 77 of ignitable material may be located in the piston recess to cover the grain 76 in the assembling of the components. The grain 76 may be composed of several coatings of a fast-burning igniter material such as Atlas L.M.N.R. or Dupont Concave #4 Beading applied in successive layers over a number of high-resistance conducting wires 78 similar to the previously described wires 40 and properly cured and coated with nitro-cotton lacquer. The electrical leads to the wires 78 as indicated at 79 and 80 are suitably insulated and connected at one end thereof to the frame member 52'. Lead 58' in member 52' corresponds to the input lead 58 described in connection with FIG. 1. Electrical energy from the source for firing the grain 29 is also supplied to the grain 76 by way of input lead 79 to also fire the grain 76, the ground circuit in this instance being by way of lead 80. The grain 76 in the frame component of the instrument operates upon ignition to urge the frame member 52' in a direction counter to the spring 50' to render the cage disabling interlock effective, the parts being conditioned as shown in FIG. 7. This figure shows the cage connection members 52' and 42' separated and shows the member 42' moved away from the rotor member 34' against the stop washer 73 under the influence of the released spring 49'.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. A gyroscopic instrument having a closed housing, an exhaust valve on the housing permitting gas to vent from the housing to the atmosphere, a gimbal ring supported in the housing with freedom about an axis, a rotor supported on the ring to spin about an axis normal to the ring axis having an axial cylindrical chamber therein and a tangentially directed vent at the periphery thereof communicating with the chamber, an ignitible propellant grain for the rotor located in the cylindrical chamber, an electrically fired detonating element for igniting the grain supported within the rotor chamber by a rotor member at the axis of the rotor having an electrical input lead, an electrical input lead and cage member on the ring translatable along the axis of the rotor to connect the lead thereof with the lead of the rotor member, an electrical input lead and cage member on the housing translatable along the axis of the rotor to engage the ring cage member to cage the ring to the housing and connect the lead thereof with the lead of the ring cage member, and means operatively connected to the housing cage member for urging said members in end to end engaged relation along the axis of the rotor to cage the ring and electrically connect the respective leads from the housing cage member to the detonating element.

2. An instrument as claimed in claim 1, in which the rotor member is translatably mounted on the rotor to facilitate relative movement thereof along the rotor axis when the propellent grain is ignited.

3. An instrument as claimed in claim 1, in which the rotor and rotor member are mechanically interlocked to prevent relative movement therebetween along the rotor axis when the propellent grain is ignited.

4. A gyroscopic instrument with a frame and a gimbal ring supported on the frame with freedom about an axis including a rotor supported on the ring to spin about an axis normal to the ring axis having an internal chamber and a tangentially directed vent at the periphery thereof communicating with the chamber, an ignitible propellant grain for the rotor in said chamber, an electrically fired element for igniting the grain supported within the rotor chamber by a rotor member at the axis of the rotor having an electrical input lead, an electrical input lead and cage member on the ring translatable along the axis of the rotor to connect the lead thereof with the lead of the rotor member, an electrical input lead and cage member on the frame translatable along the axis of the rotor to engage the ring cage member to cage the ring to the frame and connect the lead thereof with the lead of the ring cage member, and means operatively connected to the frame cage member for urging said members in end to end engaged relation along the axis of the rotor to cage the ring and electrically connect the respective leads from the frame cage member to the grain igniting element.

5. A gyroscopic instrument with a frame and a gimbal ring supported on the frame with freedom about an axis including a rotor supported on the ring to spin about an axis normal to the ring axis having an axial cylindrical chamber and a tangentially directed vent at the periphery thereof communicating with the chamber, an annular ignitible propellent grain located in said rotor chamber, an electrical detonator for igniting the grain supported within the opening in the anular propellant grain by a rotor member at the axis of the rotor having an electrical conductor, an electrical conductor and cage member on the ring translatable along the axis of the rotor to connect the conductor thereof with the conductor of the rotor member, an electrical conductor and cage member on the frame translatable along the axis of the rotor to engage the ring cage member to cage the ring to the frame and connect the conductor thereof with the conductor of the ring cage member, and means operatively connected to the frame cage member for engaging said members in end to end relation along the axis of the rotor to cage the ring and connect the electrical conductors from the frame cage member to the detonator.

6. A gyroscopic instrument with a frame and a gimbal ring supported on the frame with freedom about an axis including a rotor supported on the ring to spin about an axis normal to the ring axis having an internal chamber and a tangentially directed vent at the periphery thereof communicating with the chamber, an ignitible propellant grain for the rotor located in said chamber, a grain igniting cartridge supported within the chamber by a rotor member having an electrical input lead, an electrical input lead and cage member on the ring translatable along the axis of the rotor to connect the lead thereof with the lead of the rotor member, an electrical input lead and cage member on the frame translatable along the axis of the rotor to engage the ring cage member to cage the ring to the frame and connect the lead thereof with the lead of the ring cage member, and means operatively connected to the frame cage member for engaging said members in end to end relation along the axis of the rotor to cage the ring and connect the electrical leads from the frame cage member to the cartridge.

7. In a gyroscopic instrument having a frame, a gimbal ring supported on the frame with freedom about said ring, a reaction type rotor supported on said ring about a spin axis normal to the gimbal axis having an internal chamber and a tangentially directed vent communicating with the chamber, means for spinning the rotor including an ignitible propellent grain and an electrically fired detonator located in said chamber, and a dual mechanical and electrical connector having relatively translatable components on the rotor, ring and frame elements disposed in axial relation along the rotor axis for mechanically caging the ring to the frame and for electrically connecting the frame to the detonator.

8. The combination claimed in claim 7, in which said connector includes spring means between said frame and frame component for normally maintaining said components in engaged relation.

9. The combination claimed in claim 7, in which said connector includes spring means between said frame and frame component for normally maintaining said components in engaged relation, a normally ineffective interlock between said frame and frame component for disabling said spring means, and in which said rotor component is mounted on the rotor to move translationally along the rotor axis upon ignition of the grain to urge the ring and frame components in a direction counter to the effect thereon of said spring means and render said interlock effective.

10. The combination claimed in claim 7, in which said connector includes spring means between said frame and frame component for normally maintaining said rotor and ring components in contacted relation, a normally ineffective interlock between said frame and frame component for disabling said spring means, a second electrically fired grain in the frame operable upon ignition thereof to urge the frame component in a direction counter to the effect thereon of said spring means and render said interlock effective, and means operatively connecting the ring and ring component for separating the rotor and ring components of said connector when said spring means is disabled.

11. In a gyroscopic instrument, a rotor supported to spin about an axis having a central internal chamber therein and a tangentially directed vent communicating with the chamber, an ignitible propellant grain located in said chamber, an electrical detonator for igniting the grain, and an axial member on the rotor supporting said detonator within the rotor chamber having an electrical input lead.

12. In a gyroscopic instrument having a ring, a reaction type rotor supported on the ring to spin about an axis having an axial chamber therein communicating with a tangentially directed vent, an electrical detonator located in the chamber, an axial member on the rotor supporting the detonator within the chamber having an electrical input lead, and an axial member translatably mounted on the ring for movement along the axis of the rotor having an electrical input lead engageable with the lead of the rotor member.

13. In a gyroscopic instrument having frame, ring and rotor elements in which the rotor includes a vented axial chamber therein; an electrical detonator located in the chamber, an axial member for the rotor supporting the detonator within the chamber having an electrical input lead, an axial member translatably mounted on the ring for movement along the axis of the rotor having an electrical input lead engageable with the lead of the rotor member, an axial member translatably mounted on the frame for movement along the axis of the rotor having an electrical input lead engageable with the lead of the ring member, and means operatively connected to the frame member for biasing said members in end to end axial engagement to connect the input leads to the detonator from the frame through the ring member.

14. In a gyroscopic instrument having frame, ring and rotor elements in which the rotor includes a vented axial chamber with a propellent grain therein, an electrical detonator for igniting the grain located in the chamber, and an energizable circuit for said electrical detonator including a rotor member at the axis of the rotor having an electrical input lead to the detonator, a translatable member on the ring movable along the axis of the rotor having an electrical input lead engageable with the lead of the rotor member, a translatable member on the frame movable along the axis of the rotor having an electrical input lead engageable with the lead of the ring member, and means operatively connected to the frame member for engaging said members in end to end relation to connect the input leads to the detonator from the frame through the ring member.

15. In a gyroscopic instrument having frame, ring and rotor elements in which the rotor includes a vented axial chamber with an electrical detonator therein, an axial rotor member having an electrical lead to the detonator, an axial member on the ring movable along the axis of the rotor providing a cage element for the ring and a second electrical lead to the detonator, and an axial member on the frame movable along the axis of the rotor providing a second cage element for the ring and a third electrical lead to the detonator.

16. The combination in a gyroscopic instrument of, a ring, a rotor supported on said ring to spin about an axis having a vented chamber therein, an ignitible propellant grain and electrical detonator for igniting the grain located in the chamber, a disengageable connector having a rotor part and ring part providing an electrical input lead to the detonator, and electrical means for grounding the detonator connecting the rotor and ring.

17. The combination claimed in claim 16, in which said electrical grounding means includes a pointed conductor carried by the ring whose pointed end engages the rotor at its axis, and means for biasing the grounding conductor.

18. The combination in a gyroscopic instrument having a frame, ring and rotor elements, of, a member on the ring translatable along the axis of the rotor, means on said ring for biasing said member out of contact with the rotor, and means on said frame for overcoming said ring biasing means to connect the ring member and rotor along the axis of the rotor.

19. The combination in a gyroscopic instrument having frame, ring and rotor elements, of, a caging member on the frame translatable along the axis of the rotor, a caging member on the ring translatable along the axis of the rotor, means for biasing said frame member into caged relation with the ring member with the ring member engaging the rotor, normally effective means for disengaging the member and rotor, and normally ineffective means for disabling said biasing means having normally axially spaced interlocking parts on said frame member and on said frame.

20. The combination claimed in claim 19, including means for rendering said disabling means and said disengaging means effective operable to translate the frame member along its axis in a direction counter to the effect thereon of said biasing means.

21. In a gyroscopic instrument having a frame, a gimbal ring mounted on the frame with freedom about an axis, a reaction type rotor carried on said ring with a spin axis normal to the ring axis, and means for spinning the rotor; the combination of, means for caging the ring to the frame having end engaged, relatively movable members in the respective frame, ring and rotor elements arranged in relatively translatable coaxial relation along the spin axis of the rotor, normally ineffective means for disabling said caging means having interlocking parts on the frame and on the frame cage member, means for effecting operation of said rotor spinning means, means effective upon operation of said rotor operation effecting means for translating said frame cage member to render said caging disabling means effective, and means operable to separate the rotor member and ring cage member when said cage disabling means is effective.

22. An instrument as claimed in claim 21, in which the rotor member, the ring cage member and the frame cage member are translatably mounted along the spin axis of the rotor, and the uncaging operation is effected by translation of said frame cage member by the rotor member through the ring cage member.

23. An instrument as claimed in claim 21, in which the ring cage member and frame cage member are translatably mounted with relation to the rotor element member along the spin axis of the rotor, and the uncaging operation is effected by translation of said frame cage member.

24. Means for caging a gyroscopic instrument having a frame, a ring mounted on the frame with freedom about an axis, and a reaction type rotor carried on said ring with a spin axis normal to the ring axis, including a cage member carried by the ring translatable along the spin axis of the rotor to contact the rotor at one end thereof, a second cage member carried by the frame translatable along the spin axis of the rotor to engage the other end of said ring cage member, biasing means for said frame cage member engaging said members in end to end coaxial relation along the axis of the rotor to contact the rotor in relation to the ring and to cage the ring in relation to the frame, and normally ineffective biasing means for separating said ring cage member and the rotor.

25. A caging means as claimed in claim 24, including disabling means having normally axially spaced interlocking parts on the respective frame cage member and the frame.

26. The combination in a gyroscopic instrument of, a rotor supported to spin about an axis having a central internal chamber therein and a tangentially directed vent communicating with the chamber, an ignitible propellant grain located in said chamber, a detonator for igniting the grain, and a rotor member at the axis of the rotor supporting the detonator within the rotor chamber.

27. In a gyroscopic instrument having a frame, a ring mounted on said frame carrying a rotor with a central cavity therein communicating with a tangential vent, a propellant grain within the rotor cavity ignitible to drive the rotor, an electrical detonator within the rotor cavity energizable to ignite the propellant grain, means for caging the ring to the frame, normally ineffective means operable to release said caging means, and means operable with ignition of said grain for rendering said caging release means effective.

References Cited in the file of this patent

UNITED STATES PATENTS

| | | |
|---|---|---|
| 954,634 | Jones | Apr. 12, 1910 |
| 1,077,344 | Hennig | Nov. 4, 1913 |
| 2,005,913 | Coffman | June 25, 1935 |
| 2,729,106 | Mathiesen | Jan. 3, 1956 |

FOREIGN PATENTS

| | | |
|---|---|---|
| 21,599 | Finland | Dec. 31, 1946 |
| 101,225 | Great Britain | Feb. 22, 1917 |